Figure 1:
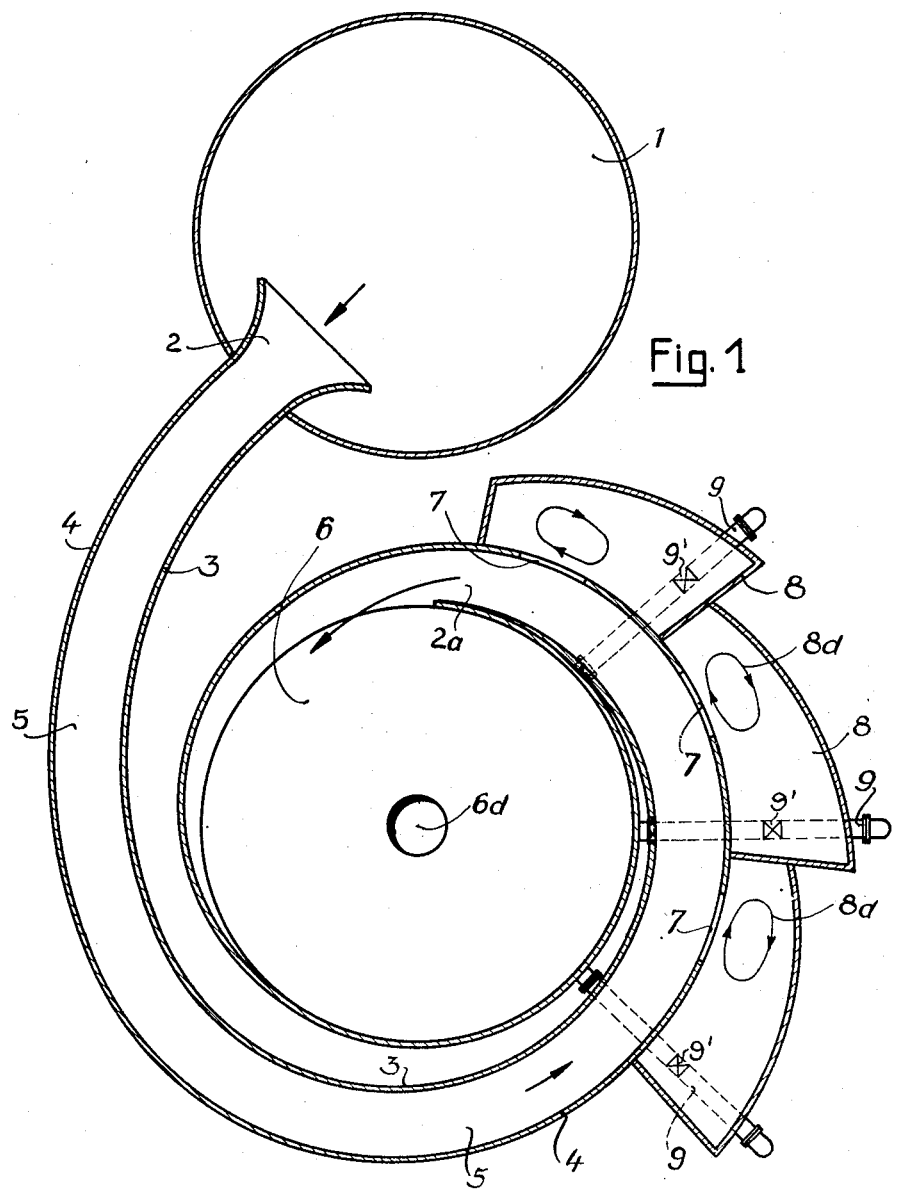

March 19, 1940. W. LINDER 2,194,361
DUST PRECIPITATOR
Filed June 24, 1937 2 Sheets-Sheet 1

Inventor:
Willy Linder
By Henry Love Clarke
his atty.

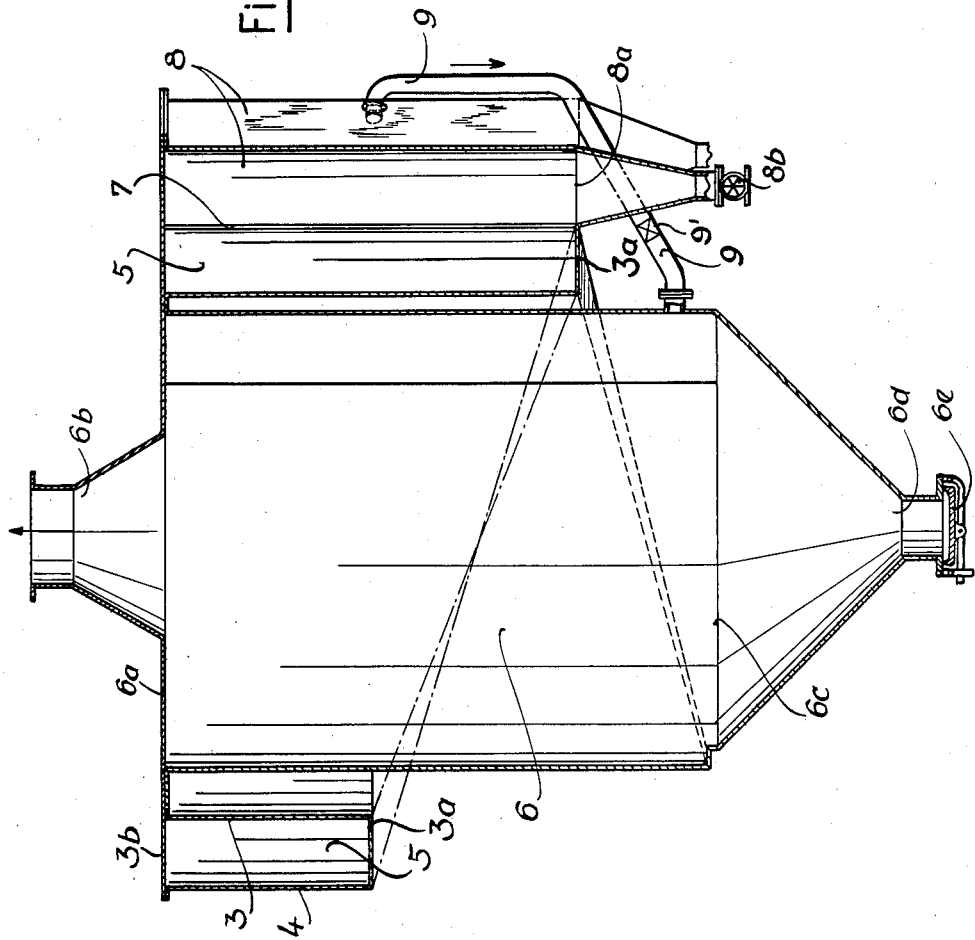

Patented Mar. 19, 1940

2,194,361

UNITED STATES PATENT OFFICE 2,194,361

DUST PRECIPITATOR

Willy Linder, Essen-Bredeney, Germany, assignor, by mesne assignments, to Koppers Company, Pittsburgh, Pa., a corporation of Delaware Application June 24, 1937, Serial No. 150,067
In Germany June 25, 1936

2 Claims. (Cl. 183—79)

The invention relates to precipitators for removing dust or other finely divided solid bodies or liquid constituents from gases, especially air, and more particularly to those dust precipitators or the like, in which the gas to be purified passes through a spiral channel, the gas entering the outer end of said channel and being discharged in the center of it.

The object of my invention is to provide improvements of such dust precipitators or the like, enabling the removing of dust or other solid or liquid particles from the gas to a much better degree, and in particular the removal of finely divided dust or the like from the gas.

If the gas to be purified is passed under a sufficient velocity through the spiral space of the precipitator, a centrifugal action is effected on the gas, by which the suspended constituents contained in the gas are forced against the outer wall of the spiral space or channel. The dust thereby has a tendency to deposit on the outer wall of the channel and gradually falls off from the wall onto the bottom of the channel, from where it may be discharged without passing again into the gas.

Although such types of dust precipitators may work fairly satisfactorily, when a comparatively coarse-grained dust is to be separated, these dust precipitators will fail when employed for dedusting gases which are contaminated by very fine and light dust. If such a very fine or light dust deposits on the outer wall of the spiral channel and falls off onto the bottom of the channel, it is nearly impossible to avoid a portion of the dust already separated from being whirled up, so that a portion of the dust already removed from the gas again enters the gas.

All these difficulties inherent in the former type of dust precipitators or the like are now fully removed by my present invention. When making use of the dust precipitator built according to my invention and incorporating a special design of the walls of the spiral precipitating channel, the dust, if once separated, cannot enter again the gas stream, which moves at a high speed.

I have arranged vertical compartments or pockets at the outer periphery of the spiral chamber, which are passed by the gas to be purified. These compartments are connected with the spiral chamber, the inner walls of such compartments being so constructed, that the gas stream within these compartments or pockets may flow without any undesired turbulence. Due to the centrifugal action to which the various dust particles are subjected within the spiral chamber, the dust will accumulate near the outer wall of the spiral channel, so that there is formed an outer gas layer in the gas stream which is rich in dust. Those dust particles which have not yet fallen downwards along the outer wall of the spiral chamber, i. e. mainly the finer dust particles, are forced, due to the centrifugal action through the openings of the outer wall of the spiral chamber into said compartments or pockets, and will precipitate on the bottom of same. By arranging the compartments or pockets sealed from the atmosphere in this way, it is possible that the dust particles gradually falling downwards do not enter again the main gas stream.

The effect of the dust precipitator constructed according to my invention can be increased in that the outer layers of the gas stream as well as the suspended particles are withdrawn in the compartments or pockets, arranged at the outer wall of the spiral chamber. This may be performed preferably in such a way, that the outer layers of the gas stream are only then discharged into said compartment, when the gas has already passed a part of the total length of the spiral channel, i. e. at such a point of said channel, where the outer gas layers are already enriched with suspended particles.

Still further objects of my present invention may be taken from the following description of a preferred embodiment thereof in connection with the accompanying drawings, in which Figure 1 is a horizontal section through a dust precipitator according to my invention, constructed of iron sheet or another suitable building material, and Figure 2 is a vertical section through the same.

The dust laden gas to be purified, first flows from the pipline 1 into the channel 5, which is of substantially rectangular cross-section and is formed by the vertical walls 3, 4 and the bottom 3a and cover 3b. The channel 5 may have the shape of a spiral with one or several windings. It enters at point 2a the middle chamber 6, the outlet 6b for purified gas being situated in the cover 6a. This outlet 6b is connected with a suitable pipline if it is desired to carry the purified gas forward for other purposes.

If the gas to be purified is moved at a sufficient speed through the spiral channel 5, the dust particles or other constituents contained in the gas, for instance drops of liquid, are pushed against the outer wall 4 of the channel, due to the centrifugal action effected in the gas, resulting from the spiral-like movement of the stream.

The dust is thus enriched in the layers of the gas stream near the wall 4.

A row of openings 7 is situated in the wall 4 of the channel. These openings have the shape of oblong and narrow vertical slots. They reach the compartment 8, arranged outside the wall 4. As may be seen from Figure 1, the openings 7 are near one end of the compartments 8 and the compartments 8 are enlarged towards the end opposite the opening 7. From this latter end of the compartments 8 which, as is well understood, are fully closed, leads a by-pass 9, connecting the compartment 8 with the lower portion of the middle chamber 6.

The compartments 8 have a conical bottom 8a, fitted with an outlet for the withdrawal of dust or the like, which is governed by a shut-off valve 8b. The bottom 6c of the middle chamber 6 is built in such a way, that the dust outlet 6d can be closed by a valve 6e.

The method of operating the dust precipitator according to my invention is briefly summarised as follows:

It has already been mentioned before, that the dust contained in the gas is forced due to the centrifugal action effected by the spiral shape of the channel 5 into the gas layers near the wall 4. The cross section of the by-pass 9, which can be altered by suitable means such as throttle valves 9', is now adjusted in such a way, that a small quantity of gas flows through each opening 7 into the respective compartment 8. As the openings are situated in the wall 4, only such a portion of the gas stream is withdrawn through these openings 7, in which the dust or the like has been enriched.

The unwithdrawn gas that is left in the channel 5, to continue to flow therethrough, is thus further freed from dust by the withdrawal of the outer layer of gas, so that the gas of channel 5, that finally enters the middle chamber 6, is practically free from dust.

The gases passing through these openings 7 into the compartments 8 now flow in the direction indicated by the arrows 8d, due to the peculiar shape of these compartments. This movement of the gas facilitates the deposition of the dust, entrained in the withdrawn layer of gas. The gas of the stream in the enlarged part of the compartments 8 is not so violent as the gas of the stream in the narrower part, so that an almost dust-free gas passes through the by-pass 9 into the chamber 6.

Under certain conditions it is possible to close the by-pass 9, so that only the dust, but not the gas in the outer layer of gas of channel 5, is withdrawn into the compartment 8 when the gases flow along the openings 7, due to the centrifugal action produced in the gas stream.

As required, the dust is removed continuously or periodically through the bottom opening from the compartment 8 and, if necessary, also from the middle chamber 6. The precipitator as described before is not only suitable for the removal of solid dust from gases, for instance air, but also for the separation of drops of liquid.

I have now described my present invention on the lines of a preferred embodiment thereof, but my invention is not limited in all its aspects to the mode of carrying it out as described and shown, since the invention may be variously embodied within the scope of the following claims.

I claim:

1. A dust precipitator comprising, a spiral gas-centrifuging chamber with an outer peripheral gas-inlet and an inner central gas-outlet through which the gas to be de-dusted is centrifuged on its way to the inner central gas-outlet; a plurality of dust discharge slots in the outer wall of the spiral chamber in advance of the central gas-outlet chamber; and dust settling compartments separate from the spiral chamber and each communicating with the same through one of the dust discharge slots; and in which the dust discharge slots are located near the ends of the respective dust settling compartments that are forwardly of the spiral, and in which the respective dust settling compartments each are enlarged in area, in a direction laterally of the spiral, from their ends forwardly of the spiral towards their ends opposite the ends at which the dust slots communicate, thereby providing settling compartments that are narrow forwardly of the spiral and wider rearwardly.

2. A dust precipitator as claimed in claim 1, and in which the dust settling compartments are each also connected with the central outlet chamber at its lower part by an adjustable by-pass line communicating with their respective dust settling compartments at their wider rear portions, so that a small quantity of gas comprising the outer rich-in-dust layer of the gas stream in the spiral may be withdrawn through the slots into the dust settling compartments at their narrower parts, leave the same less violent at their wider parts and thence enter the central gas outlet-chamber almost dust-free, while the residual gas lean in dust in the spiral may continue to flow through the spiral into the inner central gas outlet-chamber.

WILLY LINDER.